United States Patent [19]
Duren et al.

[11] Patent Number: 5,400,030
[45] Date of Patent: Mar. 21, 1995

[54] DETECTION AND MAPPING OF HYDROCARBON RESERVOIRS WITH RADAR WAVES

[75] Inventors: Richard E. Duren, Spring; Roy K. Warren, Houston, both of Tex.

[73] Assignee: Exxon Production Research Company, Houston, Tex.

[21] Appl. No.: 193,950

[22] Filed: Feb. 9, 1994

[51] Int. Cl.⁶ .............................................. G01S 13/04
[52] U.S. Cl. ..................................................... 342/22
[58] Field of Search .................. 342/22; 324/323, 326, 324/327, 328, 332

[56] References Cited

U.S. PATENT DOCUMENTS

| | | | |
|---|---|---|---|
| 2,075,808 | 4/1937 | Fliess | 342/22 |
| 2,139,460 | 12/1938 | Potapenko | 342/22 |
| 2,901,689 | 8/1959 | Barret et al. | 342/22 X |
| 4,218,678 | 8/1980 | Fowler et al. | 342/22 |
| 5,280,284 | 1/1994 | Johler | 342/22 |

*Primary Examiner*—Mark Hellner
*Attorney, Agent, or Firm*—Pravel, Hewitt, Kimball, & Krieger

[57] ABSTRACT

Radar is used to detect and map near-surface geochemical alteration of rock and soil. The radar waves penetrate a buildup of carbonate and silica on the earth surface above micro-seepage of hydrocarbons dissolved in water. The hydrocarbon source may be an oil or gas reservoir buried many thousands of feet, or it may be from near-surface, man-made features. The thickness and sensitivity of the buildup is related to the size of the underground source or reservoir. Radar echoes from the bottom of the buildup provide a reservoir detection and mapping tool.

22 Claims, 5 Drawing Sheets

DETECTION AND MAPPING OF HYDROCARBON RESERVOIRS WITH RADAR WAVES

BACKGROUND OF INVENTION

1. Field of Invention

The present invention relates to detection and mapping of hydrocarbon reservoirs using radar techniques.

2. Description of Prior Art

In the past, there have generally been two predominant types of detection and mapping techniques for hydrocarbon reservoirs using wave energy. One of these, and currently the most widely used, has been based on acoustic or seismic energy waves, whether in reflection or refraction surveying. Seismic exploration is generally time consuming and expensive, requiring extensive arrays of sensing geophones or transducers to be placed over considerable areas.

The other wave energy detection technique for hydrocarbon reservoirs has been based on the use of electromagnetic energy, or radar waves. A considerable body of prior art exists based on the assumption that the presence of subsurface hydrocarbon reservoirs caused an identifiable, discernable presence of escaping gases in the atmosphere at the earth's surface.

A great deal of thought and effort has been spent on attempts to detect and identify these escaping gases. It was supposed that both the presence and type of gas escaping from the earth could be detected based on unique radar-identifiable molecular characteristics of the different species of gases. Examples in this area includes U.S. Pat. Nos. 3,651,395; 4,100,481; 4,132,943; 4,385,516 and 4,504,833.

SUMMARY OF INVENTION

Briefly, the present invention provides a new and improved method of detection and mapping of hydrocarbon reservoirs with radar waves. With the method of the present invention, near-surface geochemical alteration of rock and soil is explored with electromagnetic energy to sense the presence of subsurface hydrocarbon reservoirs beneath the earth's surface.

Electromagnetic wave or radar energy is transmitted according to the present invention into the earth's surface to penetrate the near-surface earth materials. The radar energy is adapted to penetrate any buildup of carbonate, silica or the like in the near-surface earth materials.

With the present invention, the presence of any such carbonate, silica or the like has been postulated to result from geochemical changes at or near the earth's surface. These geochemical changes arise due to micro-seepage of hydrocarbons dissolved in water. The source of hydrocarbons generally of interest may be an oil or gas reservoir buried several thousands of feet below the earth surface.

An anomalous area of electromagnetic resistivity is formed in the near-surface earthen materials due to these geochemical changes. The electromagnetic wave energy which penetrates the near-surface earth is deflected downwardly by the anomalous area of resistivity and reflected back for detection by an electromagnetic energy or radar receiver. The reflected radar energy waves are then gathered as data for analysis to indicate the presence of subsurface hydrocarbon reservoirs.

DESCRIPTION OF PREFERRED EMBODIMENT

According to the present invention, it has been found that electromagnetic energy or radar waves can be used to detect and map near-surface geochemical alteration of rock and soil. A radar transmitter and receiver system is utilized to transmit and receive radar waves which penetrate the buildup of carbonate and silica on the earth's surface above micro-seepage of hydrocarbons dissolved in water.

The source of hydrocarbons of interest typically is an oil or gas reservoir buried many thousands of feet, although in some instances it could be from near-surface, man-made features. The thickness and resistivity of the buildup is related to the size of the reservoir. A radar echo off the bottom of the buildup provides a reservoir detection and mapping tool according to the present invention.

Figure 1:
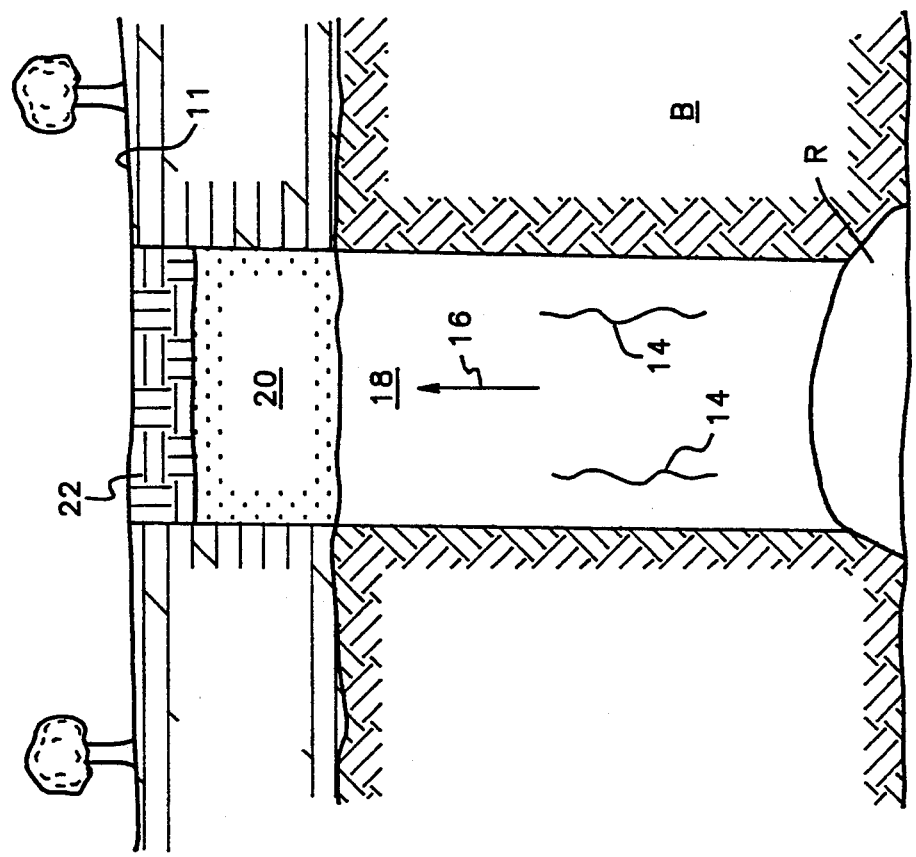

In the drawings, a hydrocarbon reservoir R buried some example distance, such as several thousands of feet or so in a large sedimentary basin B beneath the earth's surface 11 is shown (FIG. 1). Rocks in the basin B contain micro-fractures. Water from the deeper parts of the basin B continues to work upwardly as indicated by movement lines 14 extending as indicated by arrows 16. The upward water movement through the micro-fractures is due to the natural pumping action of the diurnal changes in the atmosphere of the earth.

Generally, this water has $E_h$ and $P_h$ values that place it on the reducing side of an oxidation-reduction reaction scale. Water that passes by the hydrocarbon reservoir R on its way towards the surface 11 becomes more reducing in nature because of hydrocarbon gases which dissolve in it. The upwardly moving water changes in reducing nature to the point that it causes additional rock alteration relative to nearby earth locations. This results in an isolated reducing plume or chimney 18 which eventually works it way to the oxidizing ground water of the near surface area indicated at 20 and forces a reducing chemistry onto what is normally oxidized rock material.

At a few hundred feet to a few thousand feet deep, the result of this reducing chemistry reaction is the formation of clay. From the surface 11 down to a few hundred feet, calcium carbonate and silica are precipitated as shown at 22 in the pores of the rock in the near-surface material 20. Passing over this area and looking down on this geologic feature from an airplane, one would see a circular shape within which there would be varying states of oxidation reduction reactions, depending on the amount of dissolved hydrocarbons in the water. At some oxidation state, usually close to the surface, the carbonate and silica precipitate and fill the pore spaces to form various amounts of harder material indicated at 22 that has the appearance visually of limestone.

Figure 2:
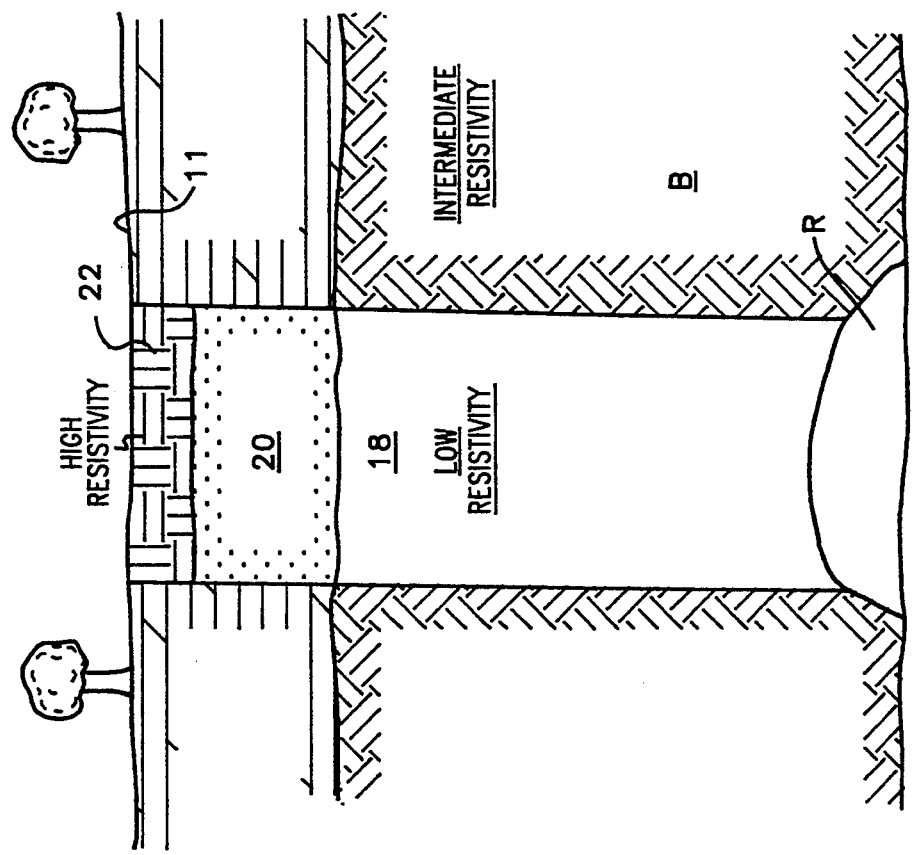
FIGS. 1 and 2 are cross-sectional views of geologic and resistivity features of the earth's surface in the vicinity of a subsurface hydrocarbon reservoir.

In FIG. 2, the same geological features are shown, but the resistivity of the rocks is indicated. The hard cap 22 has a large or high resistivity that sometimes exceeds one-hundred ohm-meters. Directly under the cap 22 is an area of lowest resistivity because of the formation of clay as indicated at 20. Usually, the intermediate average resistivity of the basin B is on the order of twice as high as that of the clay zone 18, but much less than the hard cap area 22.

With the present invention, a radar system (FIG. 5) usually in the X-band of frequencies (i.e., 8,000–12,500 MHz) is used so that an anomalous radar response can be detected from the hard cap region 22. The radar system geometry is selected so that the thickness of the cap 22 and strength of the resistivity contrast into the clay zone 20 gives information which can be used to determine where to locate a drill hole to test the reservoir R for hydrocarbon possibilities.

Figure 3A:
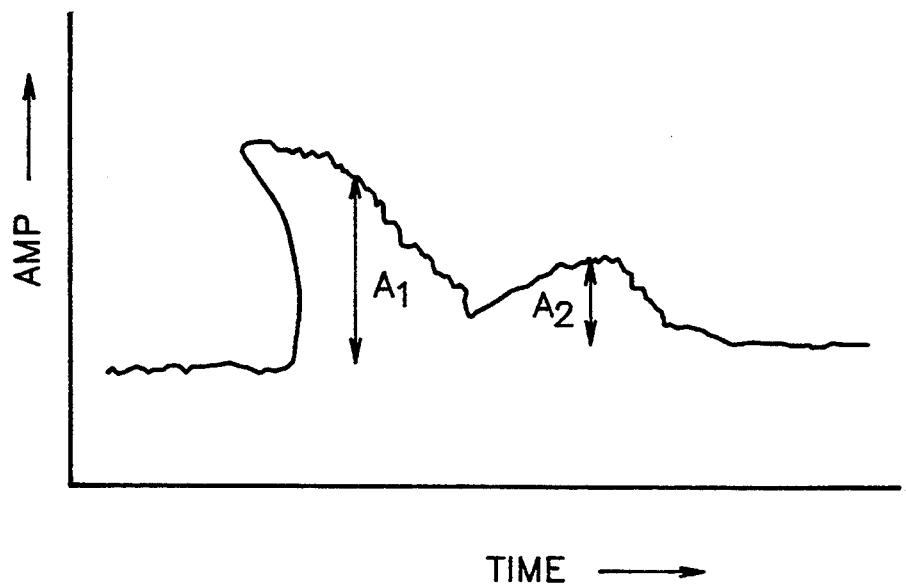
FIGS. 3A and 3B are waveform diagrams of possible radar responses off subsurface geologic features such as those shown in FIGS. 1 and 2.
Figure 3B:
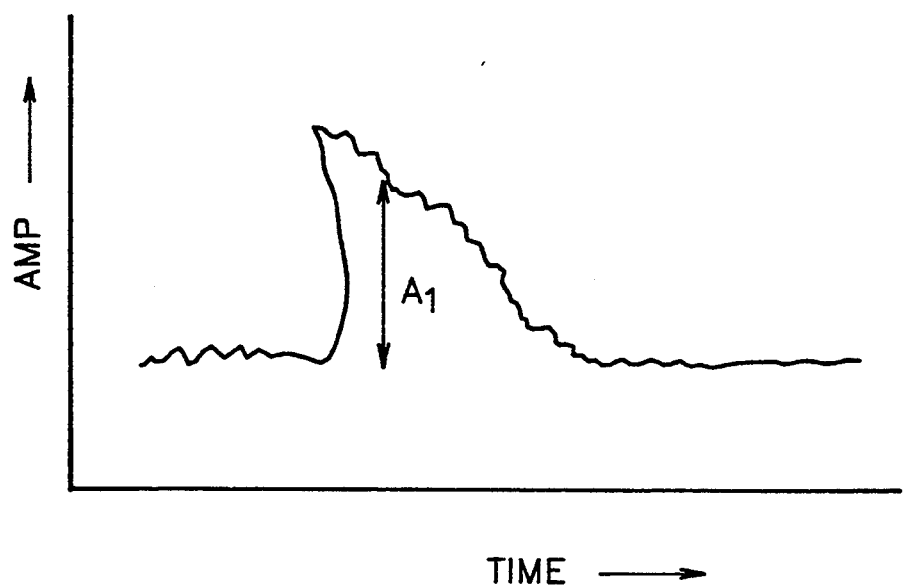

FIGS. 3A and 3B are wave form diagrams of possible radar reflection responses according to the present invention. FIG. 3A represents a response in the area of the high resistivity cap 22, while FIG. 3B represents a radar reflection in an area where no high resistivity cap 22 is present. As can be seen in FIG. 3A, on the cap 22 one finds in addition to the ordinary radar reflection amplitude $A_1$ an extra amplitude $A_2$ late in the return to the radar receiver. This extra amplitude $A_2$ is a reflection anomaly. The height of this reflection anomaly and the area under its curve $A_2$ is related directly to the resistivity contrast around and under the resistivity cap 22. The additional anomaly $A_2$ when added to the return of the normal background response $A_1$ appears in the radar receiver as if a phosphorescence exists in the air above the high resistivity cap 11. The stronger the response indicated by the anomalous amplitude $A_2$, the greater the microseepage of hydrocarbons from the reservoir R that exists.

Figure 4:
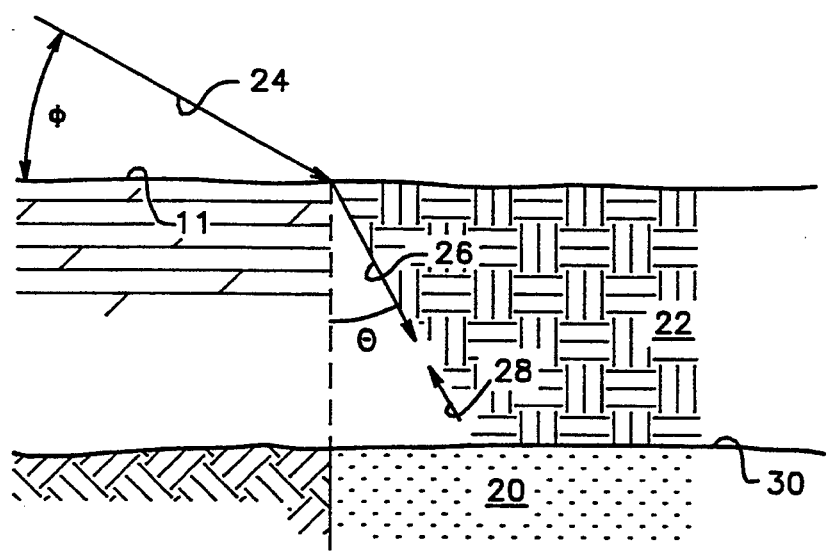
FIG. 4 is a schematic diagram of electromagnetic wave travel in geologic features like those of FIGS. 1 and 2.
Figure 5:
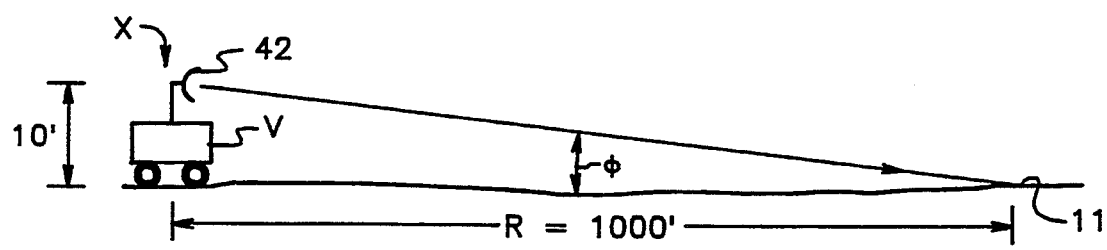
FIG. 5 is a schematic diagram of radar transmitter/receiver geometry in surveying operations according to the present invention.

As can be seen in FIG. 4, an incoming radar pulse travelling along a path as indicated by an arrow 24 and entering the high resistivity cap 22 beneath the earth's surface 11 at a grazing or depression angle $\phi$ actually penetrates the high resistivity cap 22 as indicated by an arrow 26. The radar energy travels downwardly through the high resistivity cap 22, with a portion of such energy being reflected as a backscatter pulse 28 off the clay 20 and back to the radar transmitter and receiver X (FIG. 5).

With the present invention, detection of the backscatter pulse is possible when the grazing angle $\phi$ at the surface 11 is small compared with the depression angle in the high resistivity cap 22. This makes the radar cross section, $\sigma$, off an interface 30 between the cap 22 and clay 20 much greater than the radar cross section, $\sigma_c$, of the clutter patch on the surface ($\sigma > > \sigma_c$).

Even when the grazing angle $\phi$ at the cap 22 is small, the refracted pulse is almost normal to the clay/cap interface 30. This results in a significant increase or boost in the interface radar cross section compared with surface radar cross section $\sigma_c$. The amount of such increase determines how deeply the radar can effectively penetrate or "see" into the earth subsurface, as the radar echo is decreased about 18 dB with each interface or transition to material of different resistivity. Also, there is an optimal grazing angle and polarization with which to observe these radar echoes. This grazing angle has been found to be about 19 degrees for a dielectric constant $\epsilon = 8\epsilon_o$ with the polarization being vertical. In addition, a comparison between the vertical and horizontally polarized echoes can be used to help provide an indication as to those locations where penetration occurs.

As an example, consider a conventional X-band radar system X with an antenna 42 (FIG. 5) mounted on a vehicle V, and having the following characteristics:

Peak transmitter power = 5 kw
Radiated pulse length = 0.1016 $\mu$sec = $\tau$
Radar bandwidth = $1/\tau = B_n$
Antenna 42 diameter = 4 ft = D
Operating frequency = $10^{10}$ Hz
Antenna 42 height above a flat earth surface 11 = 10 feet
Distance to target = 1000 feet It is preferred that the radar system operate in the X-band (8,000–12,500 MHz). It should be understood, however, that slightly lower frequency levels may also be used, the limiting factor being the diameter or size of antenna 42 which is feasibly transportable.

INPUT NOISE LEVEL

Figure 6:
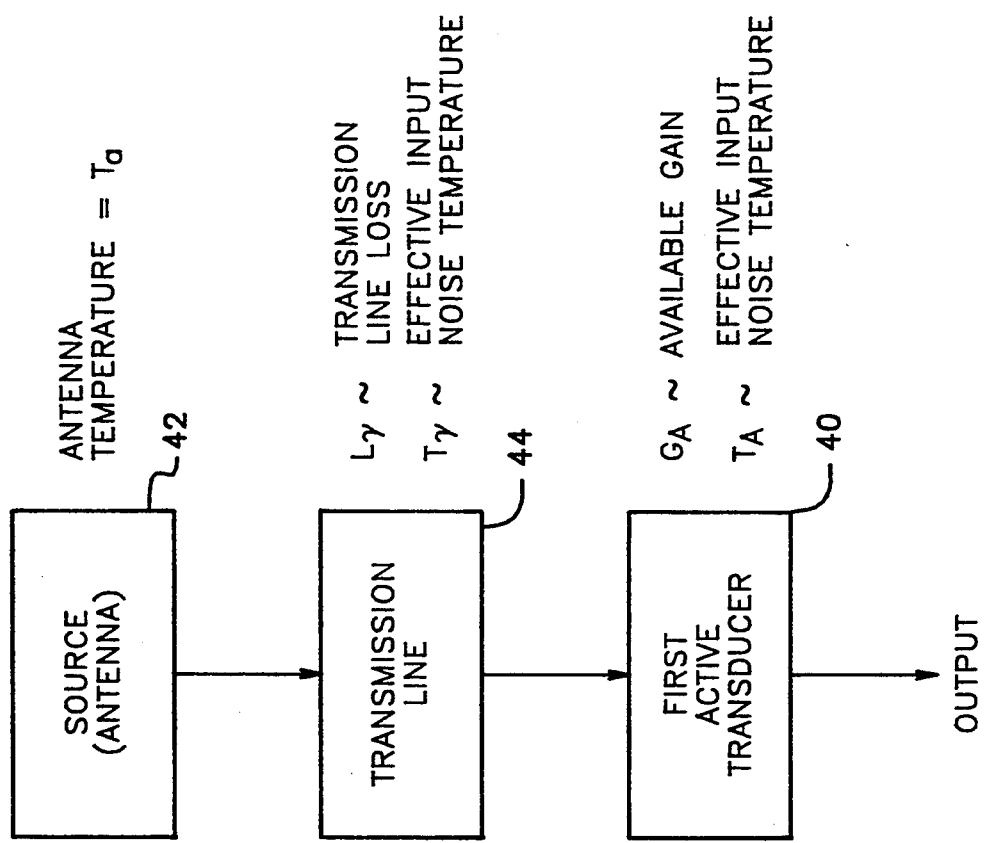
FIG. 6 is a simplified schematic block diagram of a radar transmitter/receiver system according to the present invention.

A simplified radar receiving system schematic diagram is shown in FIG. 6 to enable calculation of equivalent input noise level for the radar system X. The antenna 42 both transmits the radar wave energy and detects or gathers as data the reflected electromagnetic wave energy from subsurface areas such as the interface 30. Each receiving element is assumed to have the same noise bandwidth, $B_n$, equaling the receiver's 3-dB bandwidth. Only a single active transducer 40, or amplifier, is shown even though receivers often have several amplifier stages. However, when the gain of the first amplifier is large, as is typically the case, subsequent stages usually have little effect when determining the equivalent input noise power.

Antenna temperature, $T_a$, represents the available output noise power, $P_a$, at the receiving antenna terminals according to the relation:

$$P_a = k\, T_a\, B_n$$

$T_a$ depends on the various radiating sources (according to Planck's Radiation Law) in the receiving pattern of antenna 42 including sidelobes and backlobes. The transmission line 44 between the antenna 42 and the amplifier 40 has an available loss $L_r$ and an effective noise temperature $T_r$, while the amplifier 40 has available gain $G_A$ and an effective noise temperature $T_A$. The equivalent input noise, N, can be shown to satisfy the relation:

$$N = \text{Equivalent Input Noise} = k\, T_s\, B_n$$

where k is Boltzmann's constant and $T_s$, the system temperature, is approximately given by the relation:

$$T_s = T_a + T_r + L_r T_A$$

For the present example worst case or best case values are assumed for antenna temperature $T_a$. When considering an antenna 42 at or near the ground 11, $T_a$ can be considered typically to be about 300° K.

The transmission line 44 has effective input noise temperature is given by the equation:

$$T_r = T_{tr}(L_r - 1)$$

where $T_{tr}$ is the thermal temperature of transmission line 44, typically 290° K. It would be reasonable to expect $L_r \approx 2$ dB. $T_A$ is given by the following relation:

$$T_A = T_o(F_n - 1)$$

where $T_o = 290°$ K. and $F_n$ is the noise figure, typically about 10 dB for a simple design, such as in this example. The system temperature is about $$T_s = 4607° \text{ K.}$$

This leads to the following value for the equivalent input noise level N as:

$$N = 6.2575 \times 10^{-13} \text{ watts.}$$

CLUTTER LEVEL MEASUREMENT

The next step is to determine the clutter level. The clutter echo level, C, is given by the following equation:

$$C = \frac{P_t G^2 \lambda^2 \sigma_c}{(4\pi)^3 R^4 L}$$

where
  $P_t$ = power delivered to antenna 42 = Transmitter Power/2
  G = antenna gain
  $\lambda = c/f = 3 \times 10^{-2}$ m
  Range R = 304.8 m
  L = 3 dB (aperture blockage)
  $\sigma_c$ = clutter radar cross section It can be seen that there is a need to know values G and $\sigma_c$ before the clutter power can be calculated. To do so, one must first estimate the 3-dB beamwidth, $\Theta_{3dB}$.

$$\theta_{3\ dB} \approx 1.01 \frac{\lambda}{D} = 0.0249 \text{ rad}$$

From this, it is possible to estimate the directivity $G_D$ along the antenna 42 boresight $$G_d \approx \frac{4\pi}{\theta_{3\ dB}^2} = 43 \text{ dB}$$

One would expect the antenna to have a very small loss due to ohmic heating, so $G = G_D = 43$ dB. The range extent of the clutter patch is $CT/2 \approx 50$ feet, and the lateral extent of the clutter patch is about:

$$1000 \times \Theta_{3dB} = 24.9 \text{ feet.}$$

The area of the clutter patch can thus be seen in this example to be approximately 1245 square feet.

Figure 7:
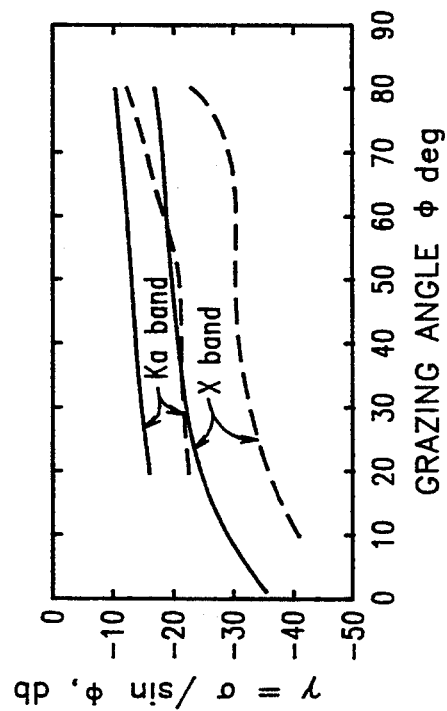
FIG. 7 is a plot of the radar cross-section parameter Y as a function of depression or grazing angle $\phi$ for transmitted radar waves towards earth surfaces.

FIG. 7 is a diagram from a known reference book, "Introduction to Radar Systems," Skolnick, p. 523. It is used to estimate the radar cross-section Y for X-band assuming a rough roadway. Such a surface would be approximately like the return from terrain having very little vegetation. The radar cross-section Y is also defined in terms of the dimensionless surface reflectivity $\sigma$ and the grazing angle $\phi$ as follows:

$$\gamma = \frac{\sigma^o}{\sin\phi}$$

From FIG. 7 a value of $Y = -36$ db $= \sigma°/\sin$ (grazing angle $\phi$) where $\sigma°$ is the clutter cross section per unit area is used. For the present case $\sigma°$ is:

$$\sigma^o = \gamma \sin 0.573°$$
$$= 2.512 \times 10^{-6}$$

and $\sigma_c$ is given by $$\sigma_c = \sigma^o [R\theta_{3\ dB}][c\tau/2]$$
$$= 2.9 \times 10^{-4} \text{ m}^2 \simeq -35.37 \text{ dB}$$

By using the above, the clutter power C can be found to be:

$$C = 7.6 \times 10^{-9} \text{ watts}$$

From this, it can clearly be seen that the clutter power C dominates the receiver noise N. Hence, it is the signal-to-clutter ratio that determines radar performance at ranges on the order of 1000 feet.

SIGNAL FROM INTERFACE

The signal power level S from interface 30 is given by the following equation:

$$S = \frac{P_t G^2 \lambda^2 \sigma}{(4\pi)^3 R^4 L}$$

where $\sigma$ is the radar cross section of an interface 30 below the surface 11. For this example assumption is made that this value of $\sigma$ is given by a modified flat plate radar cross section formula:

$$\sigma = \frac{4\pi A^2}{\lambda^2} \cos^2\theta (R_c)^2$$

where A is the same area as the clutter patch, $\Theta$ is the incident angle of penetration indicated by arrow 26 (FIG. 4) relative to normal, and $R_c$ is the reflective coefficient off the clay interface 30.

If the clay 20 is highly conductive, $R_c \approx 1$. The loss L must include skin depth loss as well as transmission losses through the air-earth interface and then back through earth-air interface. In all of the following, the assumption has been that $\epsilon = 8 \epsilon_o$, $\mu = \mu_o$ and that the conductivity varies over four values 1/10, 1/100, 1/250, and 1/5000. Skin depth for these conductivity values is given as follows:

| Conductivity $(\Omega m)^{-1}$ | Skin depth (feet) |
|---|---|
| 0.1 | 0.4927 |
| 0.01 | 4.926 |
| 0.004 | 12.32 |
| 0.002 | 24.63 |

There is a 17.37 dB two-way loss associated with a skin-depth penetration.

The ray angle 28 in the subsurface, from vertical is 20.7°. It is not exactly vertical as the conductivities are too small. Based on this value of ray angle, one can then calculate:

$$\sigma = 47.54 \text{ dB},$$

where $R_c=0.2$ is the assumed reflection coefficient off the clay interface 30. This value of $\sigma$ is a very large value compared with $\sigma_c$.

The radar echoes from surface 10 are observed at shallow grazing angles $\phi$. But the subsurface 30 is observed at near vertical angles. This has been found to lead to this striking difference in values.

Figure 8:
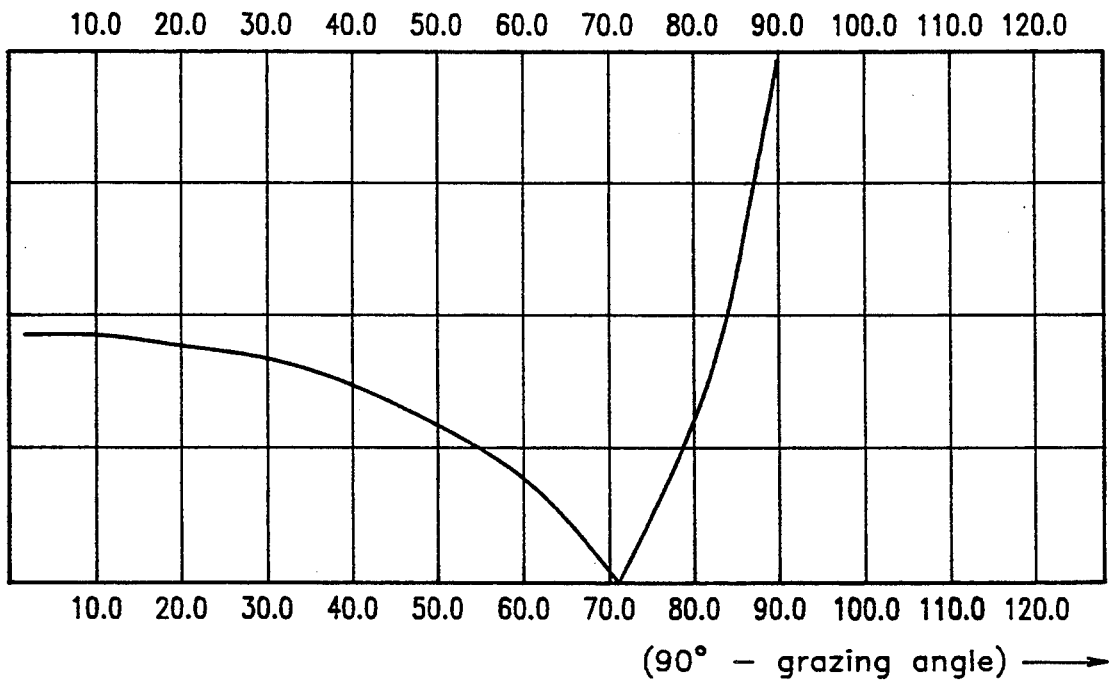
FIGS. 8 and 9 are plots of radar reflection coefficients of the earth as functions of grazing or penetration angle for a vertically and a horizontally polarized antenna, respectively.
Figure 9:
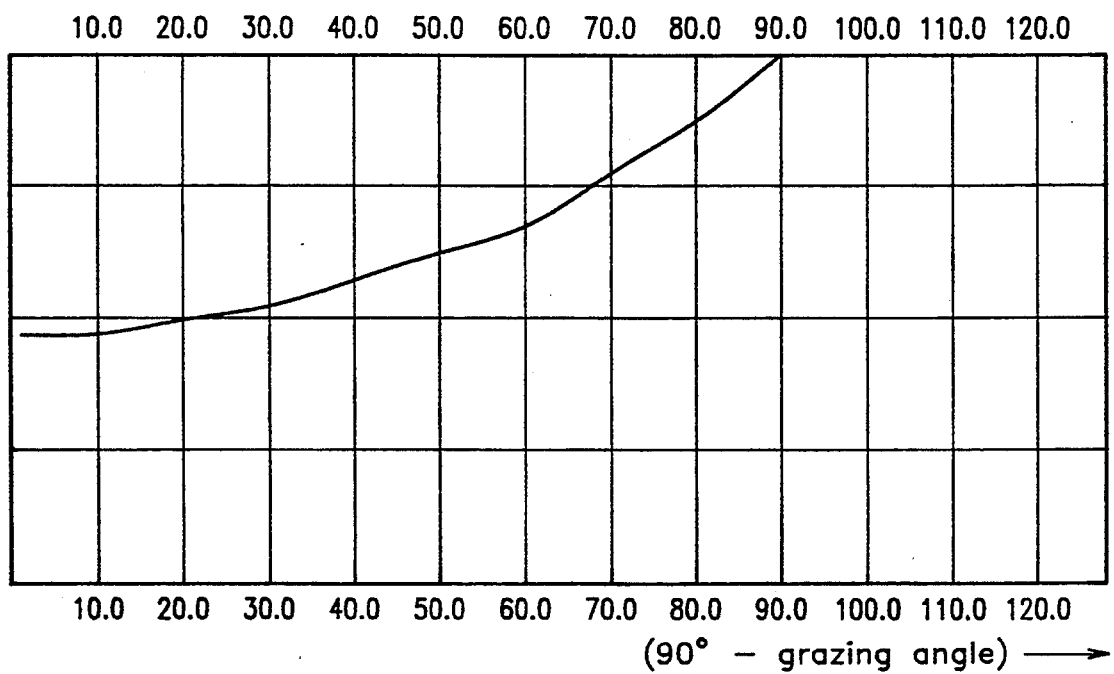

For completeness, one must still know the downgoing and upgoing transmission losses across the air-earth-interface 11. FIG. 8 and FIG. 9 show the reflection coefficient off the earth for a vertically and horizontally polarized antenna, respectively. For simplicity, the remaining analysis assumes vertical polarization. From FIG. 8 one can see that the loss across the air-earth interface 11 is about 26 dB. The loss across the earth-air interface was found to be 20.9 dB, using the same calculation techniques discussed above. The result is a total transmission loss of 46.9 dB. If it is assumed that the transmission coefficient is one minus the reflection coefficient, it is possible to calculate the signal to be:

$$S = \frac{3.037 \times 10^{-5}}{L_{skin}}$$

where $L_{skin}$, the skin loss, is left as a parameter. The signal-to-clutter ratio S/C is given by $$S/C = 36 \text{ dB} - L_{skin}(\text{dB})$$

Two skin depths would be about the point where S/C=1, and this is about as deep as one can reasonably expect the radar wave energy to penetrate for the assumed geometry described.

Figure 10:
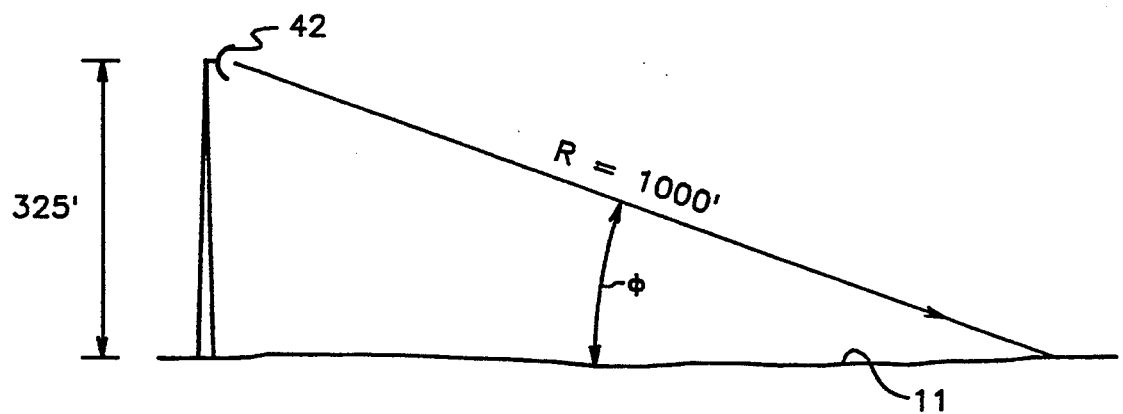
FIG. 10 is a schematic diagram of an alternate radar transmitter/receiver geometry according to the present invention from that of FIG. 5.

An alternate geometry is shown on FIG. 10 where the slant range R is held at 1,000 feet for analysis purposes. Notice from FIG. 8 that all the radar energy penetrates into the ground when the grazing angle $\phi$ is about 19°. Under this circumstance, no energy is lost in penetrating the earth and the refraction angle is about 6.61°, thereby increasing $\sigma$ by 0.52 dB. Only a 5.3 dB loss is experienced when returning through the earth-air interface 11. This provides 41.6 dB additional penetration capability. Of course, the clutter level increases as the grazing angle $\phi$ is increased to 19°.

Returning again to FIG. 7 for the radar cross-section parameter Y, one can see that Y increases by about 10 dB. Also, the clutter patch increases by about 0.25 dB. Hence, the total S/C increase is about 32 dB which is almost enough to see four skin depths into the earth. Notice if the clay layer 20 is highly conductive, one can gain an additional 14 dB ($R_c \approx 1$) and the radar easily penetrates or "sees" down to four skin depths. Even if the grazing angle is not exactly 19° but is more like 5°, one would expect only about 3 dB of loss in penetrating the air-earth interface.

From the foregoing, it can be seen that the radar transmitter/receiver system X transmits and receives radar waves which penetrate the buildup of carbonate and silica 22 on the earth's surface 11 to the interface 30 above micro-seepage of hydrocarbons dissolved in water and travelling upwardly from reservoir R. With the foregoing techniques, it is possible for the electromagnetic energy or radar waves to be used to detect and map near-surface geochemical alteration of rock and soil. The thickness and resistivity of the buildup of the layer 22 is related to the size of the subsurface reservoir R. Further, the radar echo off the bottom interface 30 provides a reservoir detection and mapping tool.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method of exploring near-surface layers of earth materials with electromagnetic wave energy to sense from areas of anomalous resistivity in the near-surface layers the presence of subsurface hydrocarbon reservoirs beneath the earth's surface, comprising the steps of:

transmitting the electromagnetic wave energy into the earth 's surface to penetrate the near-surface layers of earth materials;
reflecting the electromagnetic wave energy from interfaces below the areas of anomalous resistivity in the near-surface layers of earth materials;
gathering data indicating the presence of electromagnetic wave energy reflections from the areas of anomalous resistivity for analysis to indicate the presence of subsurface hydrocarbon reservoirs.

2. The method of claim 1, wherein the areas of anomalous resistivity are caused by geochemical changes in near-surface earthen materials due to microseepage of water entrained hydrocarbon gases.

3. The method of claim 2, further including the step of:

deflecting the electromagnetic wave energy downwardly through the near-surface earth materials as the energy enters the near-surface earth materials.

4. The method of claim 2, wherein water containing entrained hydrocarbon gases causes a reducing action on the near-surface earthen materials forming a clay.

5. The method of claim 4, wherein the clay formed is material such as calcium carbonate or silica which is precipitated into pores of rock and soil in the near-surface earthen materials.

6. The method of claim 5, wherein the precipitated materials in the near-surface earthen form a cap of high resistivity material near the earth's surface atop a layer of lower resistivity material composed of the clay.

7. The method of claim 6, further including the step of locating an electromagnetic energy wave transmitting antenna at a height and distance from an area under investigation so that the energy arrives at the earth surface at a grazing angle which is small compared to the grazing angle within the cap.

8. The method of claim 1, wherein the electromagnetic wave energy transmitted during said step of transmitting is in the X-band or slightly below.

9. A method of exploring near-surface earth materials with electromagnetic energy waves for subsurface hydrocarbon reservoirs beneath an earthen surface, comprising the steps of:

transmitting the electromagnetic energy waves into the near-surface earth materials;

penetrating with the electromagnetic energy waves areas of anomalous resistivity in near-surface earth materials caused by microseepage of hydrocarbon gases from the subsurface hydrocarbon reservoirs towards the earth surface;

detecting data indicating the presence of reflections of the electromagnetic energy from the penetrated areas of anomalous resistivity so that the reflection data may be analyzed for the presence of the subsurface hydrocarbon reservoirs.

10. The method of claim 9, further including the step of:

deflecting the electromagnetic wave energy downwardly through the near-surface earth materials as the energy enter the near-surface earth materials.

11. The method of claim 9, wherein water containing entrained hydrocarbon gases causes a reducing action on the near-surface earthen materials forming a clay.

12. The method of claim 11, wherein the clay formed is material such as calcium carbonate or silica which is precipitated into pores of rock and soil in the near-surface earthen materials.

13. The method of claim 12, wherein the precipitated materials in the near-surface earthen form a cap of high resistivity material near the earth's surface atop a layer of lower resistivity material composed of the clay.

14. The method of claim 13, further including the step of locating an electromagnetic energy wave transmitting antenna at a height and distance from an area under investigation so that the energy arrives at the earth surface at a grazing angle which is small compared to the grazing angle within the cap.

15. The method of claim 9, wherein the electromagnetic wave energy transmitted during said step of transmitting is in the X-band or slightly below.

16. A method of exploring near-surface layers of materials beneath earthen surfaces with electromagnetic energy waves for areas of anomalous near-surface resistivity which indicate the presence of subsurface hydrocarbon reservoirs, comprising the steps of:

transmitting the electromagnetic waves into the near-surface layers to penetrate areas of anomalous resistivity indicative of geochemical changes in near surface earth materials from microseepage of hydrocarbon gases from the subsurface reservoirs; and detecting data indicative of reflections of the electromagnetic energy from interfaces below the areas of anomalous resistivity for analysis for the presence of subsurface hydrocarbon reservoirs.

17. The method of claim 16, further including the step of:

deflecting the electromagnetic wave energy downwardly through the near-surface earth materials as the energy enter the near-surface earth materials.

18. The method of claim 16, wherein water containing entrained hydrocarbon gases causes a reducing action on the near-surface earthen materials forming a clay.

19. The method of claim 18, wherein the clay formed is material such as calcium carbonate or silica which is precipitated into pores of rock and soil in the near-surface earthen materials.

20. The method of claim 19, wherein the precipitated materials in the near-surface earthen form a cap of high resistivity material near the earth's surface atop a layer of lower resistivity material composed of the clay.

21. The method of claim 20, further including the step of locating an electromagnetic energy wave transmitting antenna at a height and distance from an area under investigation so that the energy arrives at the earth surface at a grazing angle which is small compared to the grazing angle within the cap.

22. The method of claim 21, wherein the electromagnetic wave energy transmitted during said step of transmitting is in the X-band or slightly below.

* * * * *